United States Patent [19]

Hashimoto

[11] Patent Number: 4,788,714
[45] Date of Patent: Nov. 29, 1988

[54] REMOTE CONTROLLING TELEPHONE UNIT FOR SELECTIVELY ACTIVATING ONE OF A PLURALITY OF DEVICES

[75] Inventor: Kazuo Hashimoto, Tokyo, Japan

[73] Assignee: Hashimoto Corporation, Tokyo, Japan

[21] Appl. No.: 83,015

[22] Filed: Aug. 6, 1987

Related U.S. Application Data

[63] Continuation-in-part of Ser. No. 792,045, Oct. 28, 1985, abandoned.

[30] Foreign Application Priority Data

Oct. 26, 1984 [JP] Japan ............... 59-225545

[51] Int. Cl.⁴ ............................................. H04M 1/65
[52] U.S. Cl. .................................... 379/74; 379/102
[58] Field of Search ............... 379/74, 77, 79, 102, 379/104, 105, 75, 29, 67

[56] References Cited

U.S. PATENT DOCUMENTS

| | | | |
|---|---|---|---|
| 3,793,487 | 2/1974 | Kilby | 379/74 |
| 4,021,615 | 5/1977 | James et al. | 379/102 |
| 4,064,367 | 12/1977 | O'Malley | 179/6.11 |
| 4,174,517 | 11/1979 | Mandel | 379/102 |
| 4,393,278 | 7/1983 | Miyoshi | 179/2 A |
| 4,444,999 | 4/1984 | Sparrevohn | 179/2 A |
| 4,488,274 | 12/1984 | Plunkett, Jr. | 379/75 |
| 4,503,288 | 3/1985 | Kessler | 379/79 |
| 4,514,593 | 4/1985 | Hattori et al. | 179/6.07 |
| 4,518,827 | 5/1985 | Sagara | 379/77 |
| 4,552,993 | 11/1985 | Hales | 179/2 A |

FOREIGN PATENT DOCUMENTS

| | | | |
|---|---|---|---|
| 57-188191 | 11/1982 | Japan | 379/102 |
| 60-114060 | 6/1985 | Japan | 379/102 |

OTHER PUBLICATIONS

*Turn–On Appliances Via Long Distance*, Guilder, pp. 32–42 and 95, Radio Electronics, Apr. 1977, vol. 48, No. 4.

*Primary Examiner*—Raymond F. Cardillo
*Assistant Examiner*—James E. Tomassini
*Attorney, Agent, or Firm*—Lowe, Price, LeBlanc, Becker & Shur

[57] ABSTRACT

A remote control unit controls at least one additional device such as a facsimile system through a telephone answering device. The telephone answering device is engaged with telephone lines upon reception of a ringing signal, and an outgoing message and an instruction message are sent out. A calling party can record an incoming message in a recorder in the telephone answering device if desired. However, when the calling party wishes to drive an additional device, a remote control signal corresponding to the desired additional device is sent in accordance with the instruction message. Then, the desired additional device can be driven, and other data can be transmitted or received. If the calling party sends the wrong remote control signal and therefore drives the wrong additional device, the calling party can reset the wrong device and drive the correct device by sending the correct remote control code, without hanging up the telephone.

4 Claims, 3 Drawing Sheets

FIG.2
FIG.2a
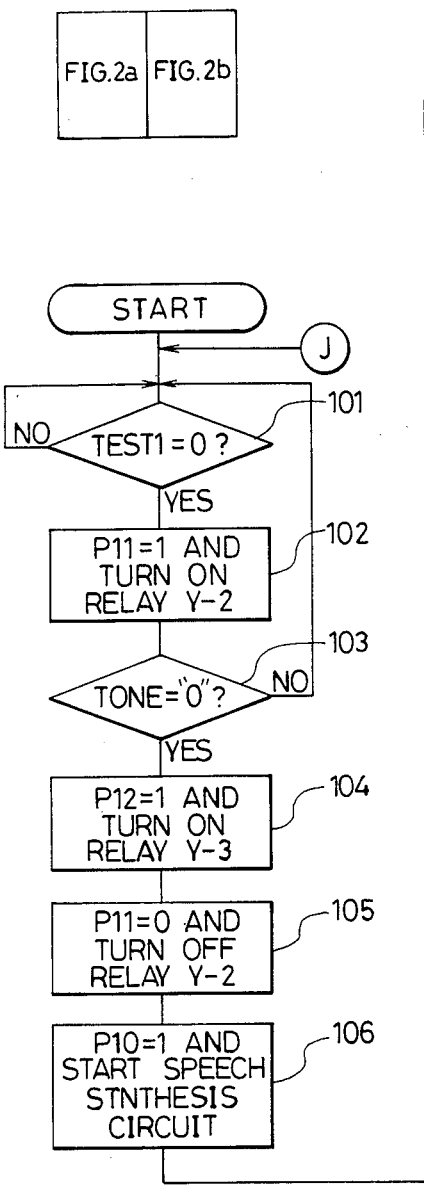
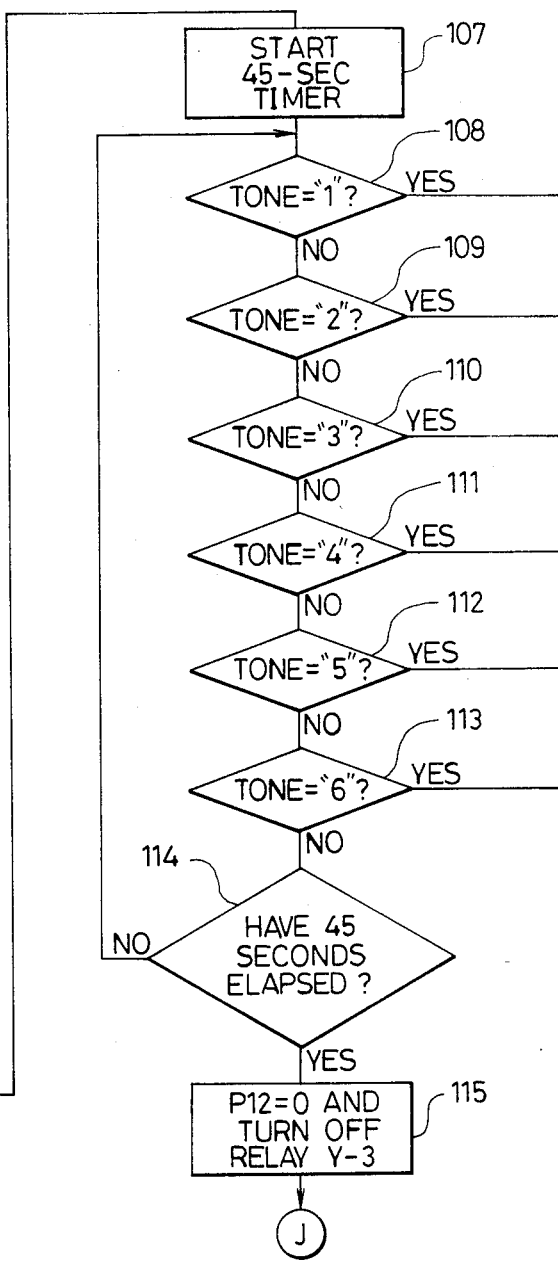

REMOTE CONTROLLING TELEPHONE UNIT FOR SELECTIVELY ACTIVATING ONE OF A PLURALITY OF DEVICES

This application is a continuation-in-part of application Ser. No. 792,045, filed Oct. 28, 1985, now abandoned.

BACKGROUND OF THE INVENTION

The present invention relates to a remote control unit for controlling through telephone lines an additional device coupled to a telephone set, and more particularly relates to such a unit wherein the user, having controlled the wrong additional device by sending a wrong remote control signal to the devices, can, without hanging up the telephone, control the correct device by sending the correct control signal.

Different types of nontelephone system additional devices tend to be attached to a telephone system in recent years. For example, a facsimile system connected to a telephone set generates an off-hook signal upon ringing once or twice irrespective of the will of the calling party and starts facsimile operation without going through a speech state, thus confusing the calling party. When an additional device other than the facsimile system is connected to the telephone set, the speech communication by means of telephone sets is also neglected, and the operation of the nontelephone system additional device has a priority over telephone communication, resulting in inconvenience.

SUMMARY OF THE INVENTION

It is an object of the present invention to provide a remote control unit for an additional device connected to a telephone set, wherein the unit checks whether or not a calling party wishes to operate the additional device connected to the telephone set equipped with an automatic telephone answering device upon reception of an incoming call, thereby selectively allowing recording of a message by the automatic telephone answering device or operation of the additional device.

According to the present invention, there is provided a remote control unit for controlling through telephone lines at least one additional device connected to a telephone set equipped with an automatic telephone answering device.

According to the present invention, the automatic telephone answering device is automatically engaged with the telephone lines upon reception of a ringing signal, and an outgoing message is sent to a calling party. The outgoing message includes a message representing procedures for instructing the calling party to operate the additional device if desired. When the calling party does not send a remote control signal for operating the additional device upon reception of the outgoing message, the automatic telephone answering device is set in the incoming message record mode. The calling party can record an incoming message in the automatic telephone answering device. When the automatic telephone answering device is engaged with the telephone lines, the remote control unit causes an engagement detecting means to detect the off-hook signal and a coupling means, responsive to an output from the engagement detecting means, to electrically connect the telephone lines to a discriminating means for discriminating the remote control signal sent from the calling party. When the calling party sends the remote control signal while the outgoing message is being sent thereto or the incoming message therefrom is being recorded, the remote control signal is supplied to the discriminating means through the coupling means. The remote control signal is thus discriminated by the discriminating means. The additional device selected by the remote control signal is operated by an additional device driving means which responds to the discrimination results, and at the same time, the telephone lines are engaged with the additional device and the automatic telephone answering device is disengaged from the telephone lines.

The remote control unit of the present invention has advantages in that inconvenience caused by immediate operation of an additional device connected to the telephone set upon reception of a ringing signal irrespective of the will of the calling party can be eliminated, the additional device such as a facsimile system and a personal computer can be properly connected to the telephone lines without confusing an indefinite number of calling parties since the automatic telephone answering device is used to instruct the subsequent procedures, and the additional device can be started after the incoming message is recorded in the incoming message recording means of the automatic telephone answering device, so that speech communication by the automatic telephone answering device and data transmission by the additional device can both be enabled, thereby achieving convenient data transmission.

In the event that the wrong additional device is, by error, conencted to the telephone line by the user who has sent the wrong control signal, the user can connect the correct device to the telephone line by sending the correct remote control signal, without hanging up the telephone. This is accomplished in the remote control unit by a first means responsive to a particular signal received on the telephone line for placing all said devices into a standby condition; a second means responsive to a predetermined remote control signal received on the telephone line for placing a corresponding predetermined one of said devices into an operating condition; and a third means for placing said predetermined one of said devices back into the standby condition after operation thereof, ready for the next telephone call. Accordingly, each time a remote control signal is sent on the telephone line by the user, all additional devices are immediately placed into a standby condition, and the desginated device connected to the line is placed in an operating condition and thereafter automatically reset to the standby condition.

Another object of the invention is therefore to provide a telephone operated remote control unit of the type described that enables the user who realizes that he has placed the wrong additional device into an operating condition because he sent the wrong remote control signal, to place the correct device, rather than the incorrect one, into the operating condition by sending the correct remote control signal on the telephone line, without hanging up the telephone.

BRIEF DESCRIPTION OF THE DRAWINGS

FIGS. 2a–2b is a flow chart of a control program executed by a CPU of FIG. 1.

DETAILED DESCRIPTION OF THE PREFERRED EMBODIMENT

A remote control unit according to an embodiment of the present invention will be described with reference to the accompanying drawings.

Figure 1:
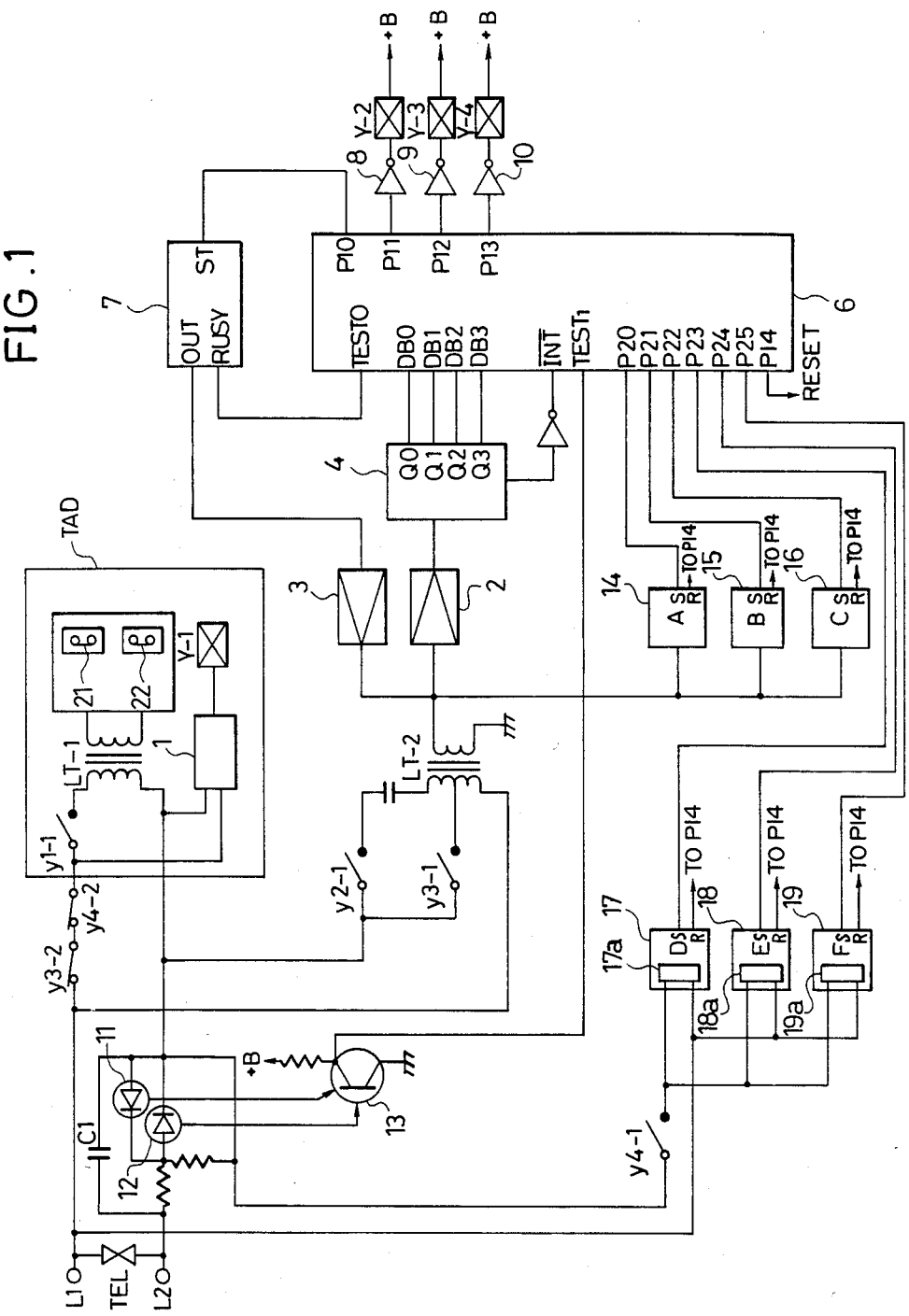
FIG. 1 is a block diagram of a remote control unit according to an embodiment of the present invention and a device associated therewith.

FIG. 1 shows a control unit for controlling an additional device connected to an automatic telephone answering device and a device associated therewith. Referring to FIG. 1, reference symbol L1 and L2 denote telephone lines, respectively; TEL, a telephone set; and TAD, a commercially available telephone answering device connected to the remote control unit according to the embodiment of the present invention. Only the part of the telephone answering device TAD which is associated with the present invention is illustrated. Reference numeral 1 denotes a ringing detector for detecting a ringing signal. Reference symbol Y-1 denotes a relay energized in response to an output from the ringing detector, and deenergized in response to an on-hook signal from the calling party, a nonsignaling state, or a signal except for the speech signal as conventionally known (thus an illustration showing a construction therefor will be omitted).

The telephone answering device TAD comprises a known automatic recorder 20. An outgoing message is sent from an outgoing message tape 21 mounted in the recorder 20 onto the telephone lines L1 and L2. The recorder 20 can record on an incoming message tape 22 an incoming message sent through the telephone lines L1 and L2.

The control unit as the main feature of the present invention is connected to the telephone lines L1 and L2 in parallel with the telephone answering device TAD. In the remote control unit, reference symbol LT-2 denotes a line transformer; 2 and 3, amplifiers, respectively; 4, a tone decoder for converting a tone signal from a calling party pushphone to a 4-bit code signal corresponding thereto; and 6, a microprocessor (to be referred to as a CPU hereinafter). The CPU 6 comprises, for example, a CPU 8748 available from Intel Corp. U.S.A. The CPU 6 executes a control program to be described later. Input ports DB0 to DB3 of the CPU 6 are connected to the tone decoder 4 to receive the 4-bit code signal from the tone decoder 4. An output port P10 is connected to a start terminal ST of a speech synthesis circuit 7 (to be described later). Output ports P11 to P13 are connected to relays Y-2, Y-3 and Y-4 through drivers 8 to 10 to supply drive signals thereto, respectively. Output ports P20 to 25 are used to drive terminal devices 14 to 19 (to be described later). The CPU 6, the driver 8, the relay 2, etc. constitute an engaging means for electrically engaging the telephone lines L1 and L2 with the tone decoder 4. The CPU 6, the drivers 9, 10, the relays Y-3, Y-4, etc. constitute an additional device engaging means for electrically selectively engaging the telephone lines to the terminal devices 14 to 19 as the additional devices, thereby selectively driving the terminal devices and simultaneously disengaging the telephone answering device TAD from the telephone lines.

A test terminal TEST1 is connected to the collector of a phototransistor 13 cooperating with light-emitting diodes 11 and 12 to constitute a photocoupler for detecting the engagement of the telephone answering device TAD and the telephone lines or an on-hook signal (to be described later) from the calling party. The diodes 11 and 12 and the phototransistor 13 constitute an engagement detecting means. The terminal devices 14 to 16 do not have telephone line engaging circuits, respectively, and can be exemplified by personal computers and various electrical appliances. The terminal devices 17 to 19 have engaging circuits 17a to 19a known to those skilled in the art, respectively, and can be exemplified by facsimile systems and computers coupled to modems with engaging circuits. Each device 14–19 has a START terminal S to place the device in an operating condition and a RESET terminal R to place the device in a standby condition. The START terminals S are controlled by the CPU 6 at output ports P20–P25, respectively, and the RESET terminals R are connected together and controlled by the CPU at output port P14.

Reference symbol y2-1 denotes a normally open contact of the relay Y-2; y3-1 and y3-2, normally open and closed contacts, respectively, of the relay Y-3; y4-1, a normally open contact of the relay Y-4; and +B, a DC power source.

A terminal BUSY of the speech synthesis circuit 7 generates a signal of high level while a synthesized speech signal is being generated therefrom. The signal of high level is tested through a terminal TEST0 of the CPU 6, thereby detecting an end of synthesized speech. This operation is known well, and a detailed description thereof will be omitted. A terminal $\overline{INT}$ of the CPU 6 is provided for detecting the presence/absence of the output from the tone decoder 4.

The operation of the remote control unit having the arrangement described above will now be described with reference to FIG. 2.

Figure 2B:
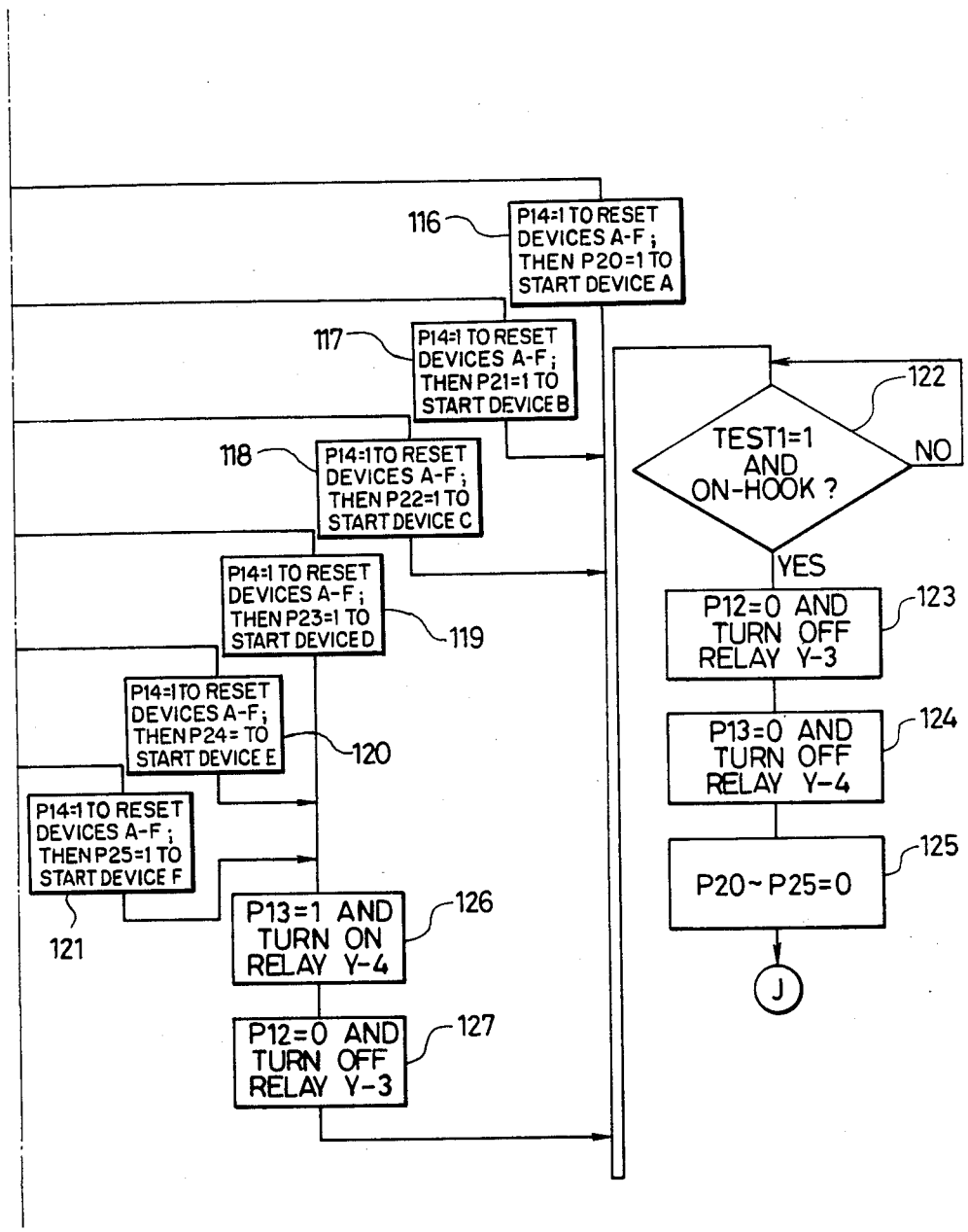

FIG. 2 is a flow chart for explaining a control program executed by the CPU 6. The CPU 6 checks in step 101 whether or not a ringing signal is received in accordance with an output level of the phototransistor 13 which appears at the test terminal TEST1. The decision step is repeated until the ringing signal is received.

When the ringing signal is received from the telephone lines L1 and L2, the ringing signal is detected by the ringing detector 1 through the normally closed contacts y3-2 and y4-2 and a capacitor C1, so that the detector 1 continuously energizes the relay Y-1. The contact y1-1 of the relay y-1 is closed, so that an engaging circuit is constituted by the contact y1-1, the primary winding of the line transformer LT-1, and the light-emitting diode 11 or 12 which is determined by the polarities of the telephone lines. When the loop or engaging circuit is formed, the ringing signal is interrupted. The calling party telephone set can communicate with the telephone answering device TAD. At the same time, when the engaging circuit is formed, the light-emitting diode 11 or 12 is turned on. In response to the ON operation of the light-emitting diode, the phototransistor 13 is turned on, and the test terminal TEST1 of the CPU 6 goes from logic "1" (i.e., high level) to logic "0" (i.e., low level).

When the test terminal TEST1 goes low, the CPU 6 determines in step 101 that the ringing signal is received, and the flow advances to step 102. The output port P11 is set at logic "1" to continuously energize the relay Y-2 through the driver 8 in step 102. As a result, the primary winding of the line transformer LT-2 is connected to the telephone lines in parallel with the telephone answering device TAD at the high-impedance tap end through the contact y2-1 of the relay Y-2. The tone decoder 4 is connected to the telephone lines L1 and L2 through the amplifier 2, the line transformer LT-2, and the like. A tone signal to be sent from the calling party can be detected.

The CPU 6 then checks in step 103 whether or not a tone "0" as an instruction message send request signal is received in accordance with the code signal received at the input ports DB0 to DB3. This decision step is repeated until the tone "0" is detected. Meanwhile, the telephone answering device TAD can communicate with the calling party, as described above. The automatic tape recorder 20 is started. As is well known, an outgoing message is sent from the outgoing message tape 21 to the calling party through the telephone lines L1 and L2. The outgoing message can be exemplified such that "This is Hanishimoto Corporation. A person who is in charge is out now. Please leave a message after a beep tone. If you wish to communicate with a terminal device such as a facsimile system, please depress the "0" button. " In this manner, the outgoing message includes a message for instructing a procedure for operating the terminal device. Since a normal calling party is not concerned with terminal devices, he records an incoming message in the incoming message tape 22 loaded in the telephone answering device TAD through the telephone lines L1 and L2 in a conventional manner when the outgoing message ends and the beep tone is heard. However, a specific calling party who is concerned with a terminal device depresses the "0" button on his own pushphone while the outgoing message is being received or after an incoming message, caller's name, for instance, is being recorded in the incoming message tape 22. Upon depression of the "0" button, the tone is detected by the tone decoder 4 which has been already connected to the telephone lines L1 and L2 through the line transformer LT-2, the amplifier 2 etc. The tone decoder 4 generates a code signal "1010" consisting of bit signals Q3, Q2, Q1 and Q0 and corresponding to the tone "0". The CPU 6 determines in step 103 that the tone "0" is received. The output port P12 is set at logic "1" to turn on the relay Y-3 in step 104. In step 105, the CPU 6 sets the output port P11 at logic "0", thereby deenergizing the relay Y-2. Upon closing of the contact y3-1 of the relay Y-3, the primary winding of the line transformer LT-2 is connected to the telephone line L2 at the low-impedance tap end (600 ohms), and the other end is always connected to the telephone line L1, thereby constituting an engaging or loop circuit. The telephone answering device TAD is disengaged by the contact y3-2 from the telephone lines L1 and L2. The telephone answering device TAD is reset to the initial state immediately or after a short period of time by means of a VOX circuit (not shown), for instance, incorporated in the device TAD upon disengagement of the device TAD from the telephone lines L1 and L2.

In step 106, the CPU 6 supplies a pulse of logic "1" from the output port P10 to the start terminal ST of the speech synthesis circuit 7, and a synthesized instruction message appears at the instruction message output terminal OUT. The instruction message is sent to the calling party through the amplifier 3, the line transformer LT-2, etc. The instruction message includes an explanation as to how the calling party should operate his telephone set to cause desired one of the terminal devices 14 to 19 to start. To this end, the instruction message explains how the calling party can send required one of various remote control signals (described hereinafter) each representing a calling party's request for initiation of operation of each terminal device. The instruction message can be exemplified such that "Depress pushbuttons as follows. Depress the "1" button for the A terminal device, "2" for B terminal device, "3" for terminal device, . . . . "

In step 107, the CPU 6 sets a time (e.g., 45 seconds) of a software timer for generating an output for deenergizing the relay Y-3. The CPU 6 discriminates in steps 108 to 114 whether or not the calling party has depressed one of the pushbuttons 1 to 6 within the time (45 seconds). When the CPU 6 determines that the calling party has not depressed the button within 45 seconds, the output port P12 is set at logic "0", the relay Y-3 is deenergized, and the remote control unit is disengaged from the telephone lines L1 and L2 (steps 114 and 115). The CPU 6 continuously energizes the relay Y-3 until 45 seconds have elapsed upon starting of the speech synthesis circuit 7, thereby maintaining the engaging state of the remote control unit. The calling party need only depress the pushbutton within 45 seconds including the instruction message transmission time. The CPU 6 detects the type of depressed button in accordance with the code signal from the tone decoder 4 (step 108 to 113). The flow advances to a corresponding one of the steps 116 to 121 in accordance with the detection result which first resets all the devices 14–19 and then starts the device corresponding to the designated code signal. For example, when the calling party depresses the "2" button to call the B terminal device 15, the corresponding tone is converted by the tone decoder 4 to a code signal. The code signal is fetched by the CPU 6. The discrimination result by the CPU 6 is determined to be negative in step 108 and affirmative in step 109. The flow then advances to step 117, and the output port P14 generates a reset pulse to all devices 14–19 to reset them into a standby condition, and then output port P21 is set at logic "1" to supply the start signal to the B terminal device 15 and to render the device 15 operative. As described above, the B terminal device 15 does not incorporate the engaging circuit, so that the device 15 establishes a communication path with the calling party by using the line transformer LT-2 constituting part of the engaging circuit. As a result, an instruction can be supplied from the calling party to the device 15 or information can be acquired from the device 15 in accordance with a function of the device 15, for instance. When the operation is ended and the calling party hangs up the phone, the light-emitting diode 11 or 12 is deenergized since it is inserted in the engaging circuit. Subsequently, when the phototransistor 13 is turned off, the test terminal TEST1 goes from logic "0" to logic "1" in step 122. The CPU 6 sets the output port P1 to logic "0" to deenergize the relay Y-3 so as to open the loop of telephone line in step 123. The output port P13 is set at logic "0" in step 124, thereby deenergizing the relay Y-4. When the A to C terminal devices 14 to 16 are operated, no change is made in step 124 since the relay Y-4 is kept off. In step 125, the output ports P20 to P25 are set at logic "0" (in the above case, only the output port P21 generates the output of logic "1", so that only the port P21 goes low), thereby resetting the terminal devices 14 to 19 (the B terminal device in the above case). The flow returns to step 101, and the remote control unit waits for the next ringing signal. In other words, the remote control unit is set in the standby mode. The same operation as described above can be applied to operation of the terminal device 14 or 16 by depressing the "1" or "3" button.

If the user realizes that he has started the wrong one of the devices 14–19 because he sent the wrong code signal, he can make a correction by sending the correct code signal, without hanging up the telephone. This is possible because the CPU 6 is programmed as described earlier to reset all devices in response to any incoming code signal and then start only the device corresponding to the code signal.

However, if the calling party wishes to instruct an operation of one (e.g., the D terminal device 17) of the terminal devices 17 to 19 each with the engaging circuit, for example, when the calling party depresses the "4" button within 45 seconds after the synthesized message is sent out, the tone is converted to the corresponding code signal. The code signal is supplied to the CPU 6. The decision step 111 is determined to be affirmative, and the CPU 6 detects depression of the "4" button. The flow advances to step 119, and the CPU 6 sets the output port P23 to logic "1", thereby starting the D terminal device 17. Subsequently, the output port P13 is set at logic "1" in step 126 to keep energizing the relay Y-4. As a result, the contact y4-1 is closed, so that an engaging circuit 17a in the D terminal device 17 which is connected in series with the contact y4-1 is operated. The D terminal device 17 is thus connected to the telephone lines L1 and L2. Subsequently, the CPU 6 sets the output port P12 to logic "0" in step 127 to deenergize the relay Y-3. The engaging circuit on the primary winding side of the line transformer LT-2 is not required and is opened. The flow advances to step 122. The D terminal device 17 is kept on until the on-hook signal is generated at the side of the calling party. When the on-hook signal is detected, the output port P13 is set at logic "0" to deenergize the relay Y-4, and the engaging circuit of the D terminal device 17 is opened (step 124). The output port P23 is set at logic "0" to deenergize the D terminal device 17 (step 125).

When the calling party depresses the "5" or "6" button so as to operate the terminal device 18 or 19, the remote control unit of this embodiment can be operated in the same manner as described above.

Thus, there is provided a remote control unit wherein any one of a number of additional devices A–F can be connected to the telephone in place of a telephone answering device, by sending on the line a code signal corresponding to the designated device. In accordance with an important aspect of the invention, each time a new code signal is sent by the user to the CPU 6, the CPU first resets all additional devices A–F and then places the correct device corresponding to the new code signal on the line in an operative condition. Accordingly, in the event that the user realizes that he has sent the wrong code signal and accordingly has connected the wrong device to the telephone line, the user can correct the mistake by merely sending the correct code signal on the telephone line to the CPU 6, to connect the designated device, without hanging up the telephone.

In the above embodiment, the instruction message is generated by only the tone "0". However, the instruction message may be sent together with the outgoing message. The calling party telephone set need not be limited to a pushphone.

What is claimed is:

1. A remote controlling telephone unit incorporating a telephone answering means including a telephone and responsive to an incoming call on a telephone line for making a loop circuit, sending a prerecording outgoing message on the line and recording an incoming message, the unit comprising:
   remote control means for controlling any one of a number of devices, such as a FAX, a TELEX and a person computer, etc., from a remote location over the telephone line, said remote control means including:
   (a) first means responsive to incoming remote control signals received on the telephone line for placing all said devices into a standby condition;
   (b) second means responsive to a predetermined remote control signal received on the telephone line for placing a corresponding predetermined one of said devices into an operating condition; and
   (c) third means for resetting said predetermined one of said devices in the standby condition after operation thereof, ready for a next telephone call;
   whereby a user who has, by mistake as a result of sending the wrong remote control signal, placed the wrong one of said devices into the operating condition, can, without hanging up the telephone, place the correct one of said devices into the operating condition by sending the correct remote control signal.

2. The remote controlling telephone unit as defined in claim 1, wherein said unit includes a CPU, and programming means for controlling said CPU to immediately reset said wrong device into the standby condition and then place said correct device into the operating condition in response to said correct control signal.

3. A remote controlling telephone unit, comprising:
   a telelphone answering means including a telephone and responsive to an incoming call on a telephone line for making a loop circuit, sending a prerecorded outgoing message on the line and recording an incoming message;
   remote control means for controlling any one of a number of devices, such as a FAX, a TELEX and a personal computer, etc., from a remote location over the telephone line, said remote control means including:
   (a) first means responsive to incoming remote control signals received on the telephone line for placing all said devices into a standby condition;
   (b) second means responsive to a predetermined remote control signal received on the telephone line for placing a corresponding predetermined one of said devices into an operating condition; and
   (c) third means for resetting said predetermined one of said devices into the standby condition after operation thereof, ready for a next telephone call;
   whereby a user who has, by mistake as a result of sending the wrong remote control signal, placed the wrong one of said devices into the operating condition, can, without hanging up the telephone, place the correct one of said devices into the operating condition by sending the correct remote control signal.

4. The remote controlling telephone unit as defined in claim 3, wherein said device includes CPU, and programming means for controlling said CPU to immediately reset said wrong device into the standby condition and then place said correct device into the operating condition in response to said correct control signal.

* * * * *